United States Patent
Liu et al.

(10) Patent No.: US 9,202,495 B2
(45) Date of Patent: Dec. 1, 2015

(54) METHOD AND APPARATUS FOR DETECTING PROXIMITY CONTACT BETWEEN A TRANSDUCER AND A MEDIUM

(75) Inventors: Dongming Liu, Eden Prairie, MN (US); Lin Zhou, Eagan, MN (US); Lance E. Stover, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 1199 days.

(21) Appl. No.: 11/799,204

(22) Filed: May 1, 2007

(65) Prior Publication Data

US 2008/0273260 A1    Nov. 6, 2008

(51) Int. Cl.
| | | |
|---|---|---|
| *G11B 5/54* | (2006.01) | |
| *G11B 21/22* | (2006.01) | |
| *G11B 5/58* | (2006.01) | |
| *G11B 5/31* | (2006.01) | |
| *G11B 5/455* | (2006.01) | |
| *G11B 5/60* | (2006.01) | |
| *G11B 5/105* | (2006.01) | |
| *G11B 5/55* | (2006.01) | |

(52) U.S. Cl.
CPC .............. *G11B 5/58* (2013.01); *G11B 5/3136* (2013.01); *G11B 5/455* (2013.01); *G11B 5/607* (2013.01); *G11B 5/6064* (2013.01); *G11B 5/105* (2013.01); *G11B 5/556* (2013.01)

(58) Field of Classification Search
None
See application file for complete search history.

(56) References Cited

U.S. PATENT DOCUMENTS

| | | | |
|---|---|---|---|
| 4,777,544 A | 10/1988 | Brown et al. | 360/75 |
| 4,835,361 A | 5/1989 | Strom | 219/121.85 |
| 4,910,621 A | 3/1990 | Matsuda et al. | 360/104 |
| 4,914,868 A | 4/1990 | Church et al. | 51/165.71 |
| 5,266,769 A | 11/1993 | Deshpande et al. | 219/121.69 |
| 5,442,850 A | 8/1995 | Kerth | 29/603 |
| 5,636,088 A | 6/1997 | Yamamoto | 360/245.1 |
| 5,808,977 A * | 9/1998 | Koyanagi et al. | 369/43 |
| 5,936,806 A | 8/1999 | Pan et al. | 360/104 |
| 5,949,627 A | 9/1999 | Williams et al. | 360/126 |
| 5,953,125 A | 9/1999 | De Groot | 356/357 |
| 6,008,640 A * | 12/1999 | Tan et al. | 324/212 |
| 6,057,975 A | 5/2000 | Yaeger et al. | 360/75 |
| 6,073,337 A | 6/2000 | Strom | 29/603.12 |
| 6,108,170 A | 8/2000 | Crawforth et al. | 360/234.3 |
| 6,268,976 B1 | 7/2001 | Carlson et al. | 360/75 |
| 6,321,440 B1 | 11/2001 | Crawforth et al. | 29/603.1 |
| 6,466,392 B1 | 10/2002 | Fioravanti | 360/75 |
| 6,466,409 B1 | 10/2002 | Baba et al. | 360/236.3 |
| 6,501,048 B1 | 12/2002 | Strom | 219/121.85 |
| 6,531,084 B1 | 3/2003 | Strom et al. | 264/400 |
| 6,665,239 B1 * | 12/2003 | Takahashi et al. | 369/44.23 |
| 6,785,079 B2 | 8/2004 | Brannon et al. | 360/75 |
| 6,798,605 B2 | 9/2004 | Kurita et al. | 360/75 |
| 6,906,450 B2 | 6/2005 | Tamayo De Miguel et al. | 310/317 |
| 6,963,464 B2 | 11/2005 | Xu et al. | 360/75 |
| 6,967,805 B1 | 11/2005 | Hanchi et al. | 360/75 |
| 6,992,865 B2 | 1/2006 | Thurn et al. | 360/294.7 |

(Continued)

*Primary Examiner* — Srilakshmi K Kumar
*Assistant Examiner* — Carl Adams
(74) *Attorney, Agent, or Firm* — David D. Brush; Westman, Champlin & Koehler, P.A.

(57) ABSTRACT

A method and apparatus are provided for positioning a transducer relative to a track of a data storage medium and inducing lateral modulation of transducer the relative to the track. An element of the transducer is actuated toward the storage medium during the lateral modulation, and atomic interaction is detected between the element and the storage medium because of a change in a response to the lateral modulation of the transducer due to the atomic interaction.

16 Claims, 4 Drawing Sheets

(56) References Cited

U.S. PATENT DOCUMENTS

| | | |
|---|---|---|
| 7,038,875 B2 | 5/2006 | Lou et al. ............... 360/75 |
| 7,260,051 B1 * | 8/2007 | Rust et al. ............ 369/126 |
| 2004/0218302 A1 * | 11/2004 | Maat .................... 360/59 |
| 2005/0024761 A1 * | 2/2005 | Lou et al. ............. 360/75 |
| 2006/0007594 A1 * | 1/2006 | Umehara et al. ...... 360/126 |
| 2007/0159729 A1 * | 7/2007 | Yoo et al. ............. 360/294.7 |

* cited by examiner

METHOD AND APPARATUS FOR DETECTING PROXIMITY CONTACT BETWEEN A TRANSDUCER AND A MEDIUM

FIELD OF THE DISCLOSURE

The present disclosure relates to detection or measurement of changes in head-medium spacing in a device in which a transducer is positioned in close proximity to an associated medium, such as a read/write head in a data storage device.

BACKGROUND

Data storage devices having moving recording media, such as rotating magnetic discs, access data stored on the media through a transducer known as a read and/or write head. The transducer is positioned in close proximity to the moving media. For performance and reliability reasons, it is important to maintain a controlled spacing between the transducer and the recording media. Head-Media Spacing (HMS) modulation is a measure of the displacement of the transducer, or head, relative to the media.

Some data storage systems employ active clearance control, wherein one or more elements of the transducer or the transducer's support structure are movable relative to the medium surface. For example, microactuators have been positioned along the transducer's suspension for displacing the transducer vertically relative to the medium. Also, the characteristics of thermal pole tip protrusion have been used for active clearance control. Differences in thermal coefficients of expansion between the materials used for forming the write pole and other elements of the transducing head can cause movement of the write pole relative to the other elements with changes in temperature. By controlling the temperature of the write pole, protrusion of the write pole relative to the other elements can be controlled to thereby control the spacing between the write pole and the medium surface. For example, thermal pole tip protrusion can be increased by elevating the temperature of the write pole material by some method, such as by turning on or elevating a write current.

Active clearance control methods adjust the temperature of the write pole based on some measure of the Head-Media Spacing. A variety of methods have been used for detecting or measuring the Head-Media Spacing. For example, U.S. Pat. No. 7,038,875 describes a dynamic measurement of Head-Media Spacing modulation, which is based on a harmonic ratio measurement of the recording head read-back signal. Typical harmonic ratio measurements need to be calibrated at zero spacing, which requires the write pole to contact the medium surface. As the write pole is actuated toward the medium surface, contact has been detected by several methods.

One current technique for rotating-disc type medium is to detect off-track movement of the head caused by friction at the contact when the head is flying at a non-zero skew angle. However, such friction can cause undesirable wear on the head and/or recording surface. For a perpendicular recording head, the write pole dimension can be less than 200 nanometers. It has been found that the tip of the write pole is often severally worn before the contact can be reliably detected. Therefore a dedicated feature, such as a contact pad, has been fabricated on the head to generate enough interaction at the contact to allow detection of the contact while preventing the write pole tip from being worn out. However, the contact pad is typically manufactured using different materials (e.g., non-magnetic) than the write pole and is typically positioned at a certain distance away from the write pole. Therefore, significant height variations can exist between the write pole and the contact pad after typical lapping and milling processes. These variations are becoming a major limitation for active clearance control since these variations often cannot be compensated by the write pole heater. A further limitation of the current detection technique is that the technique cannot detect the contact when the head is oriented at a zero skew angle relative to the tangential velocity of the disc since there is no off-track movement of the head caused by the friction at the contact.

Accordingly, alternative contact detection techniques are desired that may be capable of reliably detecting contact at the write pole without significant wear and that do not require a contact pad and its resulting head medium spacing loss caused by height variations between the write pole and the contact pad.

Embodiments of the present disclosure provide solutions to these and other problems, and offer other advantages over the prior art.

SUMMARY

An embodiment is directed to a method, which includes positioning a transducer relative to a track of a data storage medium and inducing lateral modulation of transducer the relative to the track. An element of the transducer is actuated toward the storage medium during the lateral modulation, and atomic interaction is detected between the element and the storage medium because of a change in a response to the lateral modulation of the transducer due to the atomic interaction.

Another embodiment is directed to a method, which includes positioning a transducer relative to a medium, wherein the medium moves relative to the transducer along a direction of motion, and inducing lateral modulation of the transducer relative to the direction of motion. An element of the transducer is actuated toward the medium during the lateral modulation. The method further includes monitoring a change in response to the lateral modulation of the transducer due to atomic interaction between the element and the medium.

A further embodiment is directed to a method, which includes: detecting atomic interaction between a transducer and a storage medium by monitoring a response to induced lateral modulation of the transducer relative to the storage medium; and generating an output signal indicative of a zero spacing condition between the transducer and the storage medium based on the response.

Other features and benefits that characterize embodiments of the present disclosure will be apparent upon reading the following detailed description and review of the associated drawings.

DETAILED DESCRIPTION OF ILLUSTRATIVE EMBODIMENTS

An embodiment of the present disclosure provides a method and apparatus for detecting a zero or near zero spacing condition between a transducer and a data storage medium. This detection can be used, for example, to calibrate active clearance control of the transducer.

Figure 1:
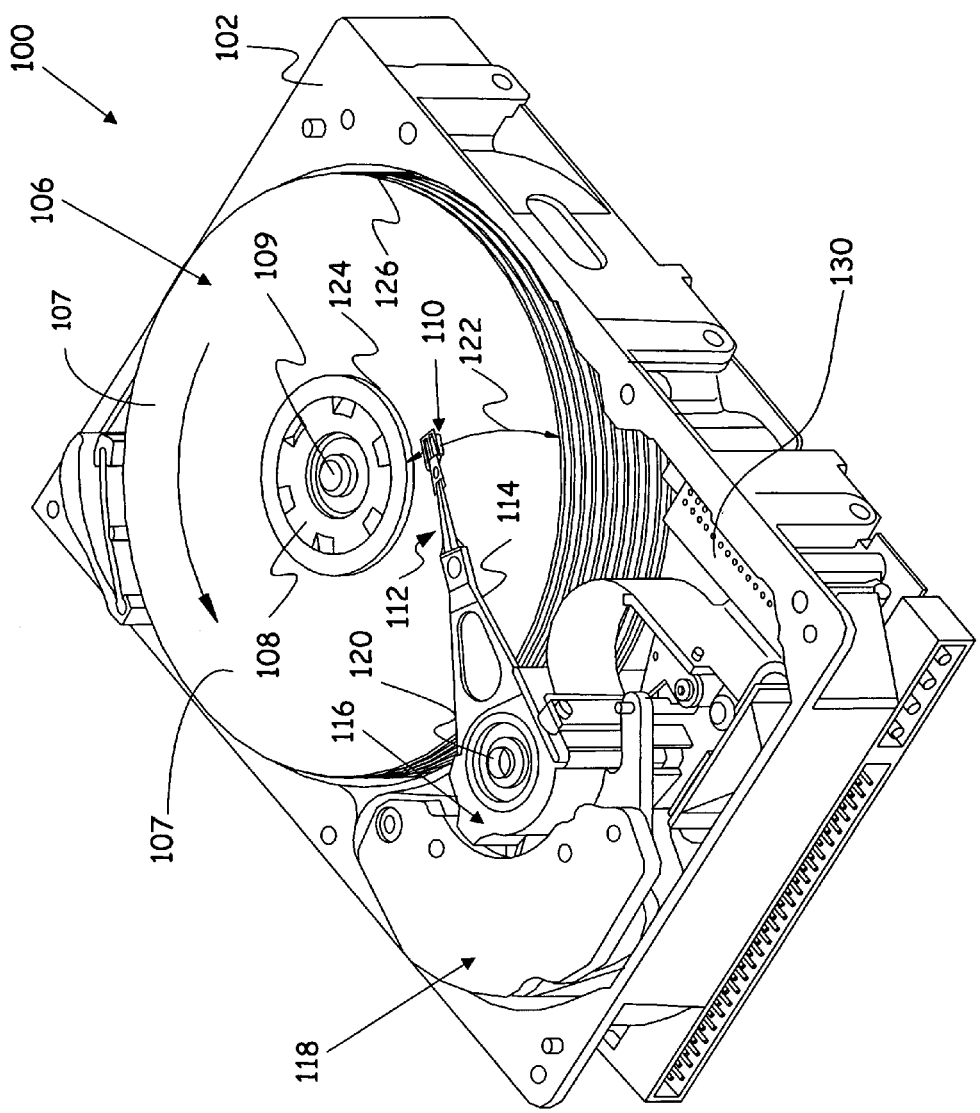
FIG. 1 is an isometric view of an example of a data storage device in which one or more embodiments of the present disclosure are useful.

FIG. 1 is an isometric view of an example of a data storage device 100 in which one or more embodiments of the present disclosure are useful. Embodiments are also useful in other types of data storage and non-data storage devices in which techniques are desired for detecting contact between a transducer and a medium that move relative to one another.

In this example, data storage device 100 includes a typical disc drive having a housing with a base 102 and a top cover (not shown). Data storage device 100 further includes a disc pack 106, which is mounted on a spindle motor (not shown) by a disc clamp 108. Disc pack 106 includes a plurality of individual discs 107, which are mounted for co-rotation about central axis 109. Each disc surface has an associated transducer 110, generally known as a disc head slider, which is mounted to disc drive 100 for communication with the disc surface. In the example shown in FIG. 1, transducers 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached transducers 110 about a pivot shaft 120 to position transducers 110 over a desired data track along an accurate path 122 between a disc inner diameter 124 and a disc outer diameter 126. Voice coil motor 118 is driven by a servo controller within electronics 130 based on signals generated by transducers 110 and a host computer (not shown).

As the spindle motor rotates disc pack 106, the discs 107 drag air between the disc surfaces and their respective transducers 110, causing an increase in air pressure that lifts the transducer and causes the transducer to "fly" above the disc surfaces. The transducer, or slider, supports one or more heads, such as a read head and/or a write head that communicates with the respective disc surface. Data is stored on the disc surface as a plurality of transitions in magnetic orientation along one or more circular, concentric tracks. As each transducers 110 passes over the magnetic transitions, the read head generates a readback signal, which is sent to a read channel within electronics 130. The read channel recovers the desired data from the readback signal. Similarly, electronics 130 includes a write channel that supplies a write signal to the write head for writing data to the disc surface.

As areal density of data storage systems continues to increase, it is important to maintain a controlled spacing between the recording medium and the read and write transducers. Some data storage systems employ active clearance control, wherein one or more elements of the transducer or the transducer's support structure (such as a portion of suspension 112) are movable vertically relative to the disc surface. Active clearance control utilizes some measure of the spacing between the transducer and the disc surface in order to control and/or limit dynamic variations in the spacing.

Head-Media Spacing modulation is a measure of the variations in displacement of the read and/or write head (or other element of the transducer) relative to the medium. Head-Media Spacing modulation is often caused by media waviness, disc clamping distortion, write current induced pole tip protrusion, micro-actuator induced modulation, as well as other factors. A variety of techniques can be used to measure Head-Media Spacing modulation. As described in U.S. Pat. No. 7,038,875, which is assigned to Seagate Technology LLC, the readback signal contains a fundamental frequency and higher harmonics. The ratio of the harmonic components is sensitive to Head-Media Spacing but less sensitive to environmental effects. According to the Wallace Spacing Loss Model, the ratio of the third and first harmonics are related to head media spacing by the following equation:

$$HR = Ce^{-4\pi(d/\lambda)} \qquad \text{Eq. 1}$$

where HR is harmonic ratio, C is a constant, $\lambda_1$ is the wavelength of the readback signal, which is equal to the disc velocity divided by the fundamental frequency, and d is head media spacing. Accordingly, head media spacing modulation can be calculated by calculating the ratio of the instantaneous amplitude of the fundamental frequency of the readback signal to the instantaneous amplitude of one of the harmonic frequencies of the readback signal. Head media spacing modulation is can be defined by:

$$\delta d = (-\lambda/4\pi)\delta Ln(HR) \qquad \text{Eq. 2}$$

Once the read channel digitizes the readback signal, a data acquisition and processing system, which is coupled to the read channel, processes the data over a selected sampling interval. The frequency spectrum of the readback signal over the selected sampling interval is calculated. The frequency spectrum and higher harmonics are calculated using fast Fourier transforms. This frequency calculation typically includes a determination of the instantaneous amplitude of the fundamental and harmonic frequency of the readback signal over the sampling interval.

The system then calculates the harmonic ratio by dividing the instantaneous amplitude of the fundamental frequency of the readback signal by the instantaneous amplitude of one of the harmonic frequencies of the readback signal. By repeating the calculations for each sampling interval of the readback signal and plotting them as a function of time, a dynamic harmonic ratio of the readback signal can be generated. By using Equation 2 above, the dynamic harmonic ratio can be used to calculate the head-media spacing modulation as a function of time.

Typical harmonic ratio measurements need to be calibrated at zero spacing. An embodiment of the present disclosure is directed to a method and apparatus for detecting or predicting "contact" before a real solid-to-solid contact event occurs. The detection of a zero spacing condition can be used to calibrate any type of activate clearance control algorithm, such as the harmonic ratio measurements discussed above, and can be used for purposes other than active clearance control. In one embodiment, the method allows reliable detection of head-disc contact at a controlled spacing with little or no wear on the head or disc.

Figure 2:
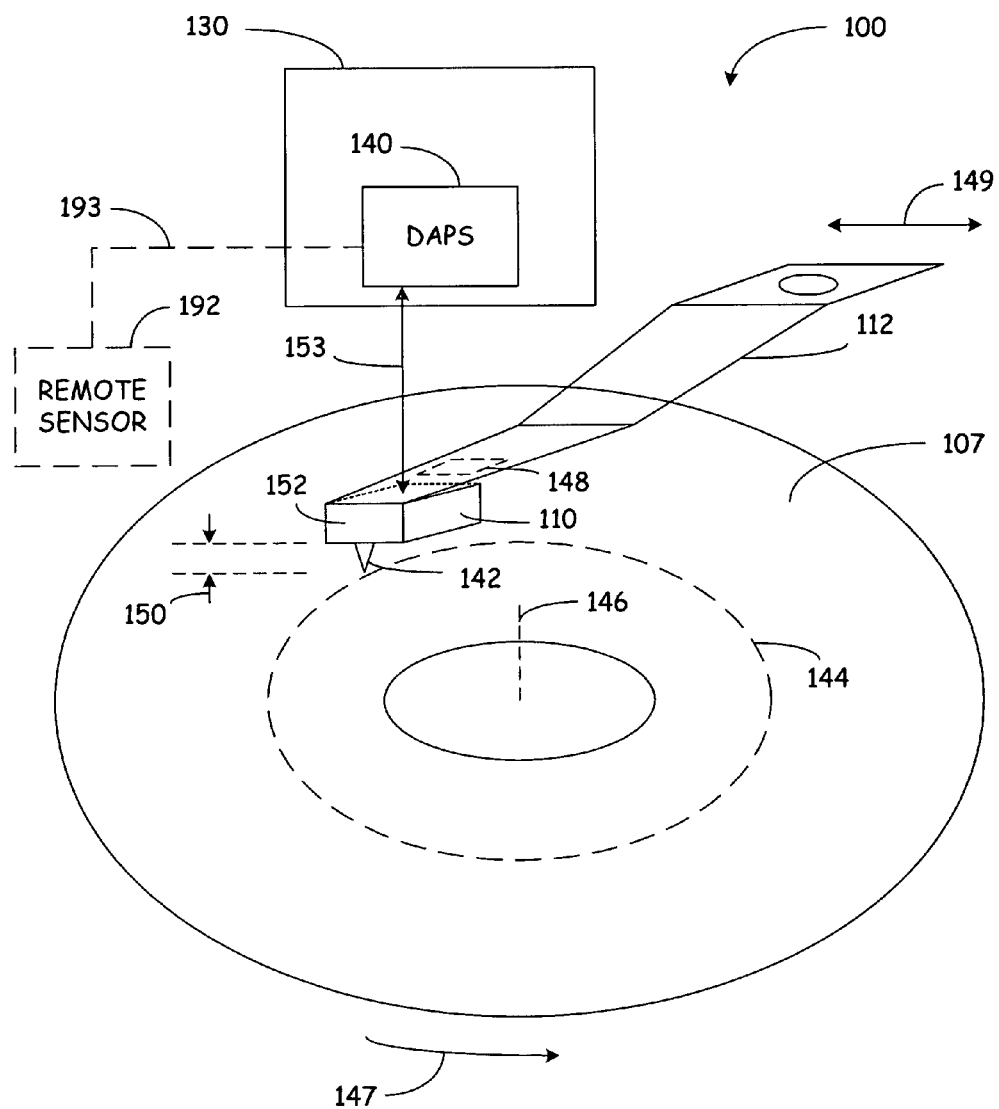
FIG. 2 is a diagram, which schematically illustrates a proximity contact detection apparatus according to an embodiment of the present disclosure.

FIG. 2 is a diagram, which schematically illustrates a proximity contact detection apparatus according to an embodiment of the present disclosure. The same reference numerals are used in FIG. 2 as were used in FIG. 1 for the same or similar elements.

Figure 3:
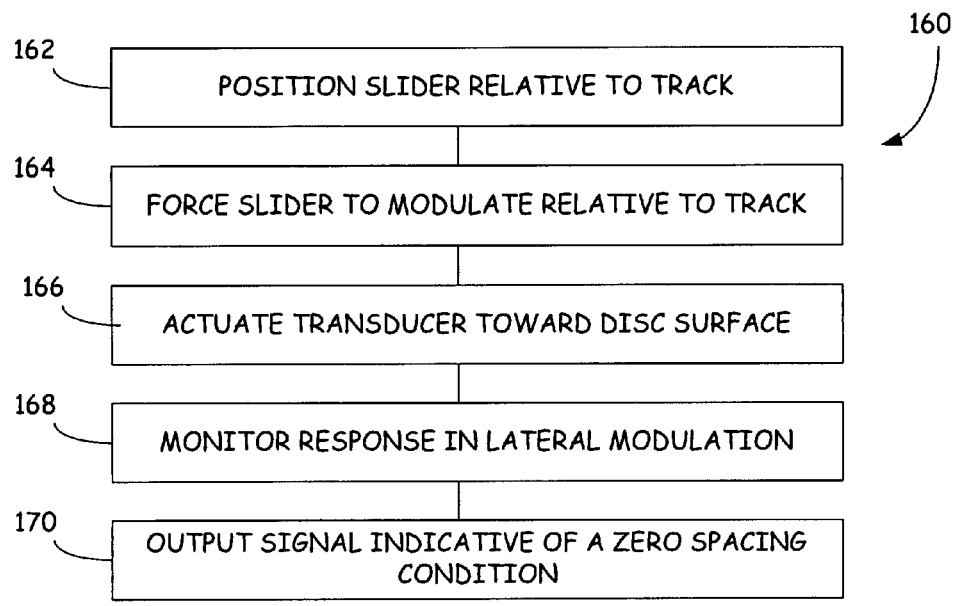
FIG. 3 is a block diagram illustrating an algorithm for detecting a zero or near zero spacing condition according to an embodiment of the disclosure.

Data acquisition and processing system (DAPS) 140 implements an algorithm 160 (shown in FIG. 3) for inducing and then detecting contact between an element 142 of transducer 110 and the surface of disc 107. In one embodiment, element 142 corresponds to a read head or a write head.

However, element 142 can be any element of transducer 110. The size and protrusion of element 142 is greatly exaggerated in FIG. 2 for clarity. Data acquisition and processing system 140 can be implemented as part of electronics 130 within data storage system 100 or can be implemented as a separate component that is connected to the data storage system, such as an application in a host or remote computer, for example.

At step 162, algorithm 160 instructs the servo control system within electronics 130 to position element 142 relative to a selected track 144. Track 144 can be pre-written prior to the execution of algorithm 160 or can be written during a step of the algorithm. As transducer 110 is positioned relative to track 144, disc 107 rotates about a central axis 146 in a direction indicated by arrow 147.

At step 164, as transducer 110 follows track 144, algorithm 160 instructs the servo control system to modulate the position of transducer 110 laterally, as shown by arrow 149, relative to the longitudinal direction of the track at a certain modulation frequency. Any suitable method or apparatus can be used to laterally modulate transducer 110. For example, if suspension 112 includes both a primary actuator, such as voice coil motor 118 (shown in FIG. 1) and a secondary, microactuator 148 located somewhere on suspension 112, the algorithm can use microactuator 148 to induce the forced lateral modulation. Any suitable type of microactuator can be used, and the microactuator can be located at or coupled to any position along suspension 112. Alternatively, the primary voice coil motor 118 can be used to induce the lateral modulation. If the calibration is being performed on a spin stand tester, the lateral modulation can be induced by an actuator arm on the spin stand tester.

The modulation frequency is selected to be at the vicinity of the intrinsic resonant frequency of the actuator on the suspension that induces the lateral modulation, such as microactuator 148. For example, the module modulation frequency can be set within a range of ±5% of the intrinsic resonant frequency of microactuator 148. However, values outside of that range can be used as well. The modulation frequency can be determined by a finite element model (FEM) or through a frequency response experiment, for example. Also, the resonant frequency can be based on other elements of suspension 112.

At step 166, as transducer 110 modulates laterally about track 144, algorithm 160 actuates an element of transducer 110, such as element 142, toward the disc surface. Arrows 150 represent vertical actuation of the element relative to the surface of disc 107. The element can be actuated independently or with any other element of transducer 110 or suspension 112. The element can be actuated toward the disc surface in a variety of ways, depending upon the structure of transducer 110 and suspension 112. For example, microactuator 148 can include a vertical displacement feature for displacing transducer 110 vertically relative to the surface of disc 107. The vertical displacement feature can be integrated with the lateral displacement feature used to laterally modulate transducer 110 or can be a separate microactuating element that can be positioned or coupled to any suitable location along suspension 112 or transducer 110. Any suitable type of microactuator can be used for vertically actuating the transducer and/or one or more elements of the transducer or suspension, such as a piezoelectric microactuator.

Also, the characteristics of thermal pole tip protrusion can be used for vertical actuation, either as an alternative to or in combination with microactuator 148. Differences in thermal coefficients of expansion between the materials used to form elements of the transducer, such as the write pole or the read head, and other elements of transducer 110 can cause movement of these elements relative to the other elements with changes in temperature. By controlling the temperature of the various elements, the movement can be controlled in order to control the vertical positions of the elements and their spacing from the disc surface. Thus, for example, thermal pole tip protrusion of the write pole can be controlled to actuate the write pole toward the disc surface by controlling the temperature of the write pole material. The temperature can be altered by any suitable method or apparatus. For example, the temperature can be elevated by turning on or elevating current through the write pole. Alternatively, a separate heating element can be applied to transducer 110 in the vicinity of or in contact with the write head or the read head. Current through the heating element can be controlled to vary the resulting temperature of the element being actuated. For example, a heating element 152 can be applied to the trailing surface of transducer 110. Other methods of actuating an element of transducer 110 relative to the surface of disc 107 can be used in alternative embodiments.

At step 168, as element 142 (or the entire transducer 110) is actuated toward the disc surface, data acquisition and processing system 140 monitors a signal 153 that is representative of the modulation response of transducer 110 to the forced lateral modulation 149. As the clearance between the closest point on transducer 110 (write pole tip in the case of actuation by thermal induced pole tip protrusion) and the disc surface is reduced to the Angstrom level, inter-atomic (Van der Waals) force between the closest point and the disc surface acts on transducer 110. The inter-atomic force becomes stronger as the atoms of the two surfaces come closer together. Another force that can act on transducer 110 before solid-to-solid contact occurs is a capillary force exerted by a lubrication layer on disc 107.

The amplitude of the transducer modulation response to the forced lateral modulation 149 decreases due to the action of the inter-atomic forces. Also, the frequency and phase of the transducer modulation response vary because of the increasing molecular interaction. One or more of these effects can be monitored in a variety of ways in order to detect a zero or near zero spacing condition between transducer 110 and disc 107 with little or no wear to the transducer elements or to disc 107.

Figure 4:
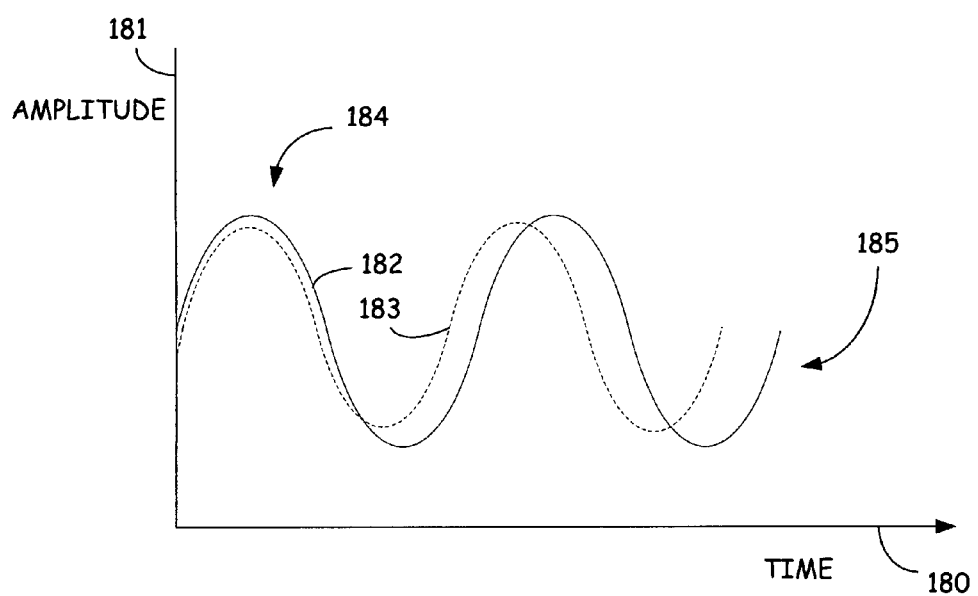
FIG. 4 is a waveform diagram illustrating an example of a change to the modulation response of a transducer due to changes in inter-atomic forces between the transducer and a respective medium.

FIG. 4 is a waveform diagram illustrating an example of a change to the modulation response of transducer 110 as the transducer nears the disc surface. Axis 180 represents time, and axis 181 represents amplitude. Waveform 182 represents the forced lateral modulation applied to transducer 110. Waveform 183 represents the modulation response of transducer 110. Arrow 184 indicates the response when the transducer is relatively far away from contact with the disc surface. Arrow 185 indicates the response when the transducer is in proximity of contact with the disc surface. As the head-media spacing decreases, the amplitude of response 183 decreases, and the response exhibits a shift in phase and frequency.

The changes in amplitude, frequency, phase and also harmonics of the modulation response can be monitored individually or can be monitored simultaneously. While amplitude detection can be relatively easy to implement, phase detection may be more sensitive since the change in amplitude vibration does not occur instantaneously with a change in the pole tip and disc interaction. Frequency and its high harmonic detection are believed to achieve even higher sensitivity than phase detection. For example, when monitoring the amplitude and looking into a fixed frequency in the frequency domain, the harmonics of the base frequency are also readily available. An algorithm can be created to use the ratios between harmonics to improve the signal to noise ratio.

A variety of different methods and apparatus can be used to monitor the modulation response and thereby generate signal 153. For example, the response of transducer 110 or any other element of suspension 112 can be measured through the readback signal generated by the read transducer. For example, when using the readback signal, data acquisition and processing system 140 can monitor the amplitude of the readback signal. As the position of the read head is modulated relative to the track center, the amplitude of the readback signal becomes modulated with increasing and decreasing magnetic field strength. The modulation response of the transducer therefore results in a modulation of the readback signal amplitude. One or more characteristics of the readback signal are therefore representative of the lateral modulation response. For example, system 140 can monitor a characteristic of a read back signal generated by the transducer in response to a data pattern stored on a track, wherein the characteristic includes at least one element of the group comprising or consisting of amplitude, phase, frequency, both amplitude and phase, both phase and frequency, both amplitude and frequency, each one of amplitude, phase and frequency, and any other suitable combination of these and other characteristics.

Figure 5:
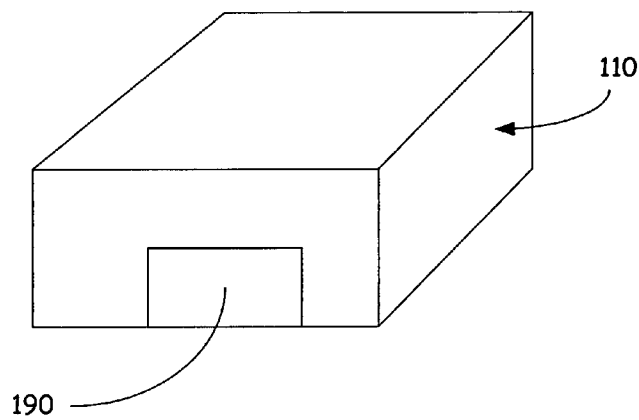
FIG. 5 is a simplified diagram of a transducer having a dedicated acoustic emission film sensor applied to a surface of the transducer, according to an embodiment of the disclosure.

Alternatively, a dedicated sensor can be built on or arranged relative to transducer 110 or suspension 112. For example, an acoustic emission (AE) sensor such as a piezoelectric film element can be built on transducer 110 for monitoring the lateral modulation frequency response. FIG. 5 is a simplified diagram of a transducer 110 having a dedicated acoustic emission film sensor 190 applied to a surface of transducer 110. Sensor 190 can be applied to any suitable surface or area of transducer 110, such as along its trailing surface.

For a suspension that has a microactuator, such as a piezoelectric microactuator, the modulation response can be measured by monitoring an electrical characteristic, such as capacitance, of the PZT element of the microactuator. For example, the PZT element can be connected as one arm of a capacitive bridge. Data acquisition and processing system 140 can monitor modulation of the electrical characteristic of the PZT element due to the modulation response of transducer 110. The microactuator can include the same microactuator element, such as microactuator 148 in FIG. 2, that is used to induce the lateral modulation or to provide vertical actuation toward the disc surface.

Other types of sensors can be used to monitor the lateral modulation response, which can be in physical contact or non-physical contact with the transducer or suspension. For example, a remote sensor 192 (shown in FIG. 2) can be used to remotely monitor the modulation response and provide a representative signal 193 to data acquisition and processing system 140. Sensor 192 can remotely monitor through a variety of technologies using electromagnetic radiation, for example. In one embodiment, sensor 192 includes an interferometer, which can be mounted internal or external to data storage system 100. The interferometer does not physically contact suspension 112 but is in optical communication with an element of suspension 112, such as transducer 110.

Referring back to FIG. 3, once data acquisition and processing system 140 has determined that the transducer (or other element of transducer 110) is positioned at or near a zero spacing with the disc surface, the system outputs a signal indicative of the zero or near zero spacing condition, at step 170. Any suitable criteria can be used for identifying a zero or near zero spacing condition or to predict an imminent solid-to-solid contact.

The characteristics of the particular signal or signals being monitored can be correlated to particular inter-atomic and capillary forces between the transducer and the disc surface. As the actuated element of the transducer nears the disc surface, a threshold can be set at which the inter-atomic and/or capillary forces indicate or predict a zero spacing condition. This threshold can be set at any desired level.

The methods and apparatus discussed above can be used to detect the interaction of an inter-atomic force at near zero spacing and before solid contact occurs. This allows detection and calibration of a zero spacing condition while eliminating wear at the contact point and the need of a contact pad. Therefore, head-medium spacing loss caused by height variations between the write pole and such a contact pad can also be eliminated. The method and apparatus can be used within a data storage device or at a spin stand tester, for example.

It is to be understood that even though numerous characteristics and advantages of various embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure to the full extent indicated by the broad general meaning of the terms in which the appended claims are expressed. For example, the particular elements may vary depending on the particular application for the transducer and its respective medium system while maintaining substantially the same functionality without departing from the scope and spirit of the present disclosure. In addition, although the embodiment described herein is directed to calibrating a measure of the head-media spacing in a data storage system, it will be appreciated by those skilled in the art that the teachings of the present disclosure can be applied to any device in which detection of a zero or near zero spacing condition between a transducer and a respective medium is desired, without departing from the scope and spirit of the present disclosure.

What is claimed is:

1. A method comprising:
    a) positioning a disc head slider comprising a magnetic head relative to a track of a data storage medium, the magnetic head producing a readback signal from the data storage medium;
    b) inducing lateral modulation of the disc head slider and the magnetic head carried by the slider at a predetermined modulation frequency relative to the track with an actuator, wherein the actuator is distinct from the magnetic head;
    c) actuating an element of the magnetic head toward the storage medium during step b) by heating the element to cause thermal pole tip protrusion of the element toward the storage medium with respect to the disc head slider; and
    d) detecting a change in a response to the lateral modulation of the disc head slider due to the atomic interaction between the element and the storage medium by monitoring a change in phase of the readback signal produced by the magnetic head, and generating an output signal indicative of a zero spacing condition between the element of the magnetic head and the storage medium based on the change in phase.

2. The method of claim 1 wherein step b) comprises:
    inducing the lateral modulation with the actuator at a frequency within in a vicinity of an intrinsic resonant frequency of the actuator.

3. The method of claim 1 wherein the element comprises a write pole and wherein heating comprises increasing an electrical current through the write pole.

4. The method of claim 1 wherein heating comprises increasing an electrical current through a heating element on the element.

5. The method of claim 1 wherein:
step a) comprises positioning the disc head slider with a primary actuator through a suspension and with a secondary, microactuator that is carried by the suspension; and
step b) comprises inducing lateral modulation of the disc head slider and the magnetic head using the microactuator.

6. The method of claim 1, wherein detecting comprises:
detecting the change in the response to the lateral modulation of the disc head slider due to the atomic interaction between the element and the storage medium by monitoring a change in phase of the readback signal produced by the magnetic head as the element of the disc head slider is actuated toward the medium.

7. A method comprising:
a) positioning a disc head slider, which comprises a magnetic head, relative to a medium with a primary actuator through a suspension and with a secondary, microactuator that is connected to the suspension, wherein the medium moves relative to the disc head slider along a direction of motion and the magnetic head produces a readback signal from the data storage medium;
b) inducing lateral modulation of the disc head slider and the magnetic head carried by the disc head slider at a predetermined modulation frequency relative to the direction of motion using the microactuator, wherein the microactuator is distinct from the magnetic head;
c) actuating an element of the magnetic head toward the medium during step b) by heating the element to cause thermal pole tip protrusion of the element toward the storage medium with respect to the disc head slider;
d) monitoring a change in response to the lateral modulation of the disc head slider due to atomic interaction between the element and the medium by monitoring a change in phase of the readback signal produced by the magnetic head as the element of the disc head slider is actuated toward the medium; and
e) generating an output signal indicative of a zero spacing condition between the element of the magnetic head and the medium based on the change in phase of the readback signal produced by the magnetic head.

8. The method of claim 7 wherein step b) comprises:
inducing the lateral modulation with the microactuator at a frequency within in a vicinity of an intrinsic resonant frequency of the actuator.

9. The method of claim 7 wherein the element comprises a write pole and step c) comprises heating comprises increasing an electrical current through the write pole.

10. The method of claim 7 wherein step c) comprises increasing an electrical current through a heating element.

11. A method comprising:
detecting atomic interaction between a disc head slider and a storage medium by monitoring change in phase of a readback signal produced by a magnetic head of the disc head slider as an element of the magnetic head is actuated toward the storage medium by heating the element to cause thermal pole tip protrusion of the element toward the storage medium with respect to the disc head slider, wherein the change in phase represents a response to lateral modulation of the disc head slider relative to the storage medium due to the atomic interaction, wherein the lateral modulation is induced at a predetermined modulation frequency by an actuator that is distinct from the magnetic head; and
generating an output signal indicative of a zero spacing condition between the element of the magnetic head and the storage medium based on the change in phase of the readback signal.

12. The method of claim 11, and comprising:
inducing the lateral modulation with the actuator at a frequency within a vicinity of an intrinsic resonant frequency of the actuator.

13. The method of claim 11, and comprising:
actuating the element of the magnetic head toward the storage medium while lateral movement of the disc head slider is being induced by the actuator.

14. The method of claim 11, wherein the element comprises a write pole and wherein heating comprises increasing an electrical current through the write pole.

15. The method of claim 11, wherein heating comprises increasing an electrical current through a heating element.

16. The method of claim 11, and comprising:
positioning the disc head slider with a primary actuator through a suspension and with a secondary, microactuator that is connected to the suspension; and
inducing the lateral modulation of the disc head slider and the magnetic head using the microactuator.

* * * * *